United States Patent

Drews

[11] 3,972,494
[45] Aug. 3, 1976

[54] VEHICLE AIR SCREEN APPARATUS

[76] Inventor: Hilbert F. P. Drews, 5640 S. 76th St., Greendale, Wis. 53219

[22] Filed: Aug. 30, 1974

[21] Appl. No.: 502,048

[52] U.S. Cl. ............................ 244/130; 114/67 A; 180/84; 244/40 A; 244/42 CC; 244/73 B; 296/91
[51] Int. Cl.² ...................... B64C 1/38; B63B 1/38
[58] Field of Search ................ 296/1 S, 91; 180/84, 180/1 R, ; 244/130, 42 CC, 40 R, 40 A, 73 B; 114/67 A, 150, 151; 115/11, 14

[56] References Cited
UNITED STATES PATENTS

| | | | |
|---|---|---|---|
| 2,367,426 | 1/1945 | Patterson | 296/91 |
| 2,477,461 | 7/1949 | Lee | 244/40 A X |
| 3,075,489 | 1/1963 | Eichenberger | 244/130 UX |

FOREIGN PATENTS OR APPLICATIONS

| | | | |
|---|---|---|---|
| 846,970 | 9/1939 | France | 244/130 |
| 669,150 | 10/1964 | Italy | 244/42 CC |

*Primary Examiner*—Stephen G. Kunin
*Attorney, Agent, or Firm*—Andrus, Sceales, Starke & Sawall

[57] ABSTRACT

A land, water or air vehicle has a jet air stream unit mounted in front with a plurality of distributed jets generated immediately preceding the front wall portion of the vehicle to reduce the opposing pressure as well as the mass of air with the resulting greater ease in movement of the vehicle. As applied to an automobile type vehicle, an air pump is located immediately behind the radiator so as not to unduly interfere with the air flow through the conventional radiator. A small air jet forming unit is mounted in front of the vehicle having an inlet connected to the air pump and outlets directed at right angles to the line of motion. The jets are generally in a semi-circular pattern with the lower portion free of jets for removal of the air from immediately preceding the automobile while permitting sufficient air flow to the radiator. In winged aircraft, an appropriate air screen apparatus is secured to the forward or leading edge of the wing to produce air jets directed normal to the direction of the movement of the air foil section to minimize the wind resistance and effectively control the contour of the air foil section. In watercraft, an air or water jet screen may also be created below the water line to part the water and reduce the opposition to movement through the water.

3 Claims, 14 Drawing Figures

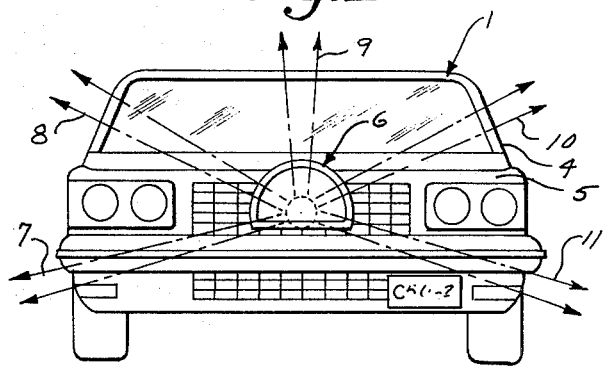
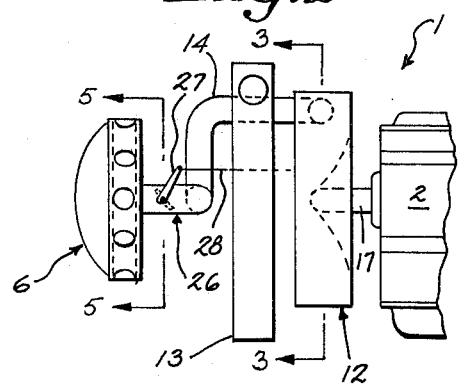
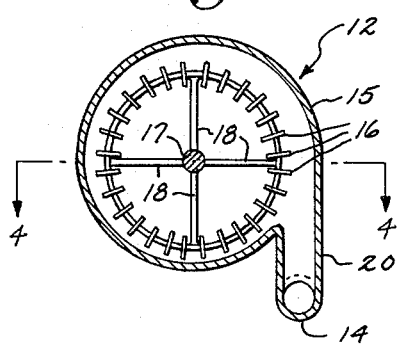
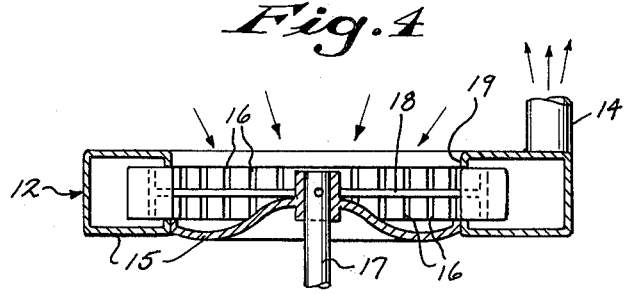
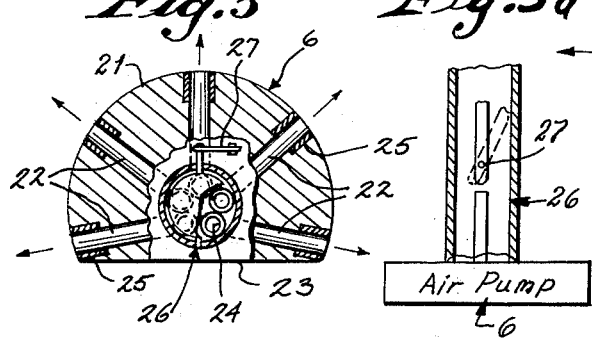
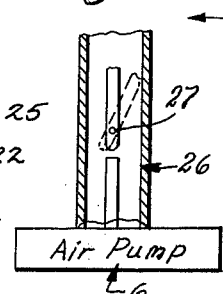
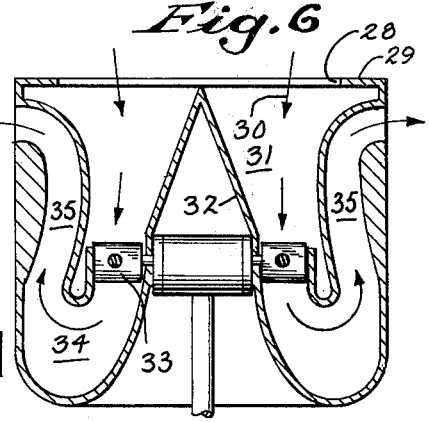
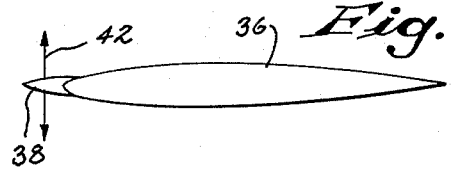
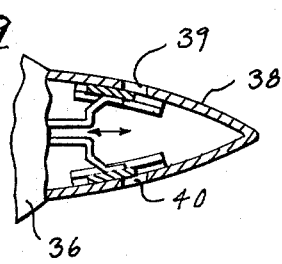
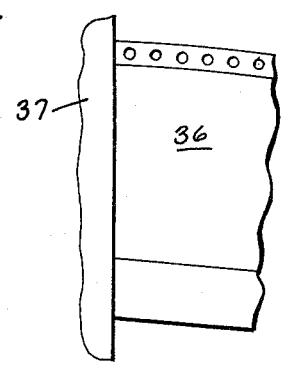
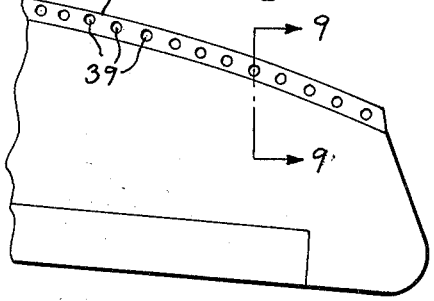

VEHICLE AIR SCREEN APPARATUS

BACKGROUND OF INVENTION

The present invention relates to an apparatus for reducing the resisting air pattern preceding a vehicle.

Vehicles such as land, water and air vehicles in addition to providing energy to move the mass of the vehicles must overcome the effects of the air mass through which they move. Thus, as a vehicle moves through the air, the vehicle, in essence, must divert or move the air immediately in front of the vehicle. The forward wall portion of the vehicle body engaging the air mass results in a compaction and diversion of such air as the vehicle moves through the air. Various methods to minimize the effect have been provided through special design of the surfaces which tend to minimize the force required to move the vehicle through the air. Streamlined surfacing and shaping of a vehicle has been particularly developed to improve the lateral diversion of the air to minimize the forward forces required. Although such systems have been suggested and are widely employed, the air mass in front of the vehicle remains a significant factor in the overall efficiency of operation.

SUMMARY OF THE PRESENT INVENTION

The present invention is particularly directed to a method and apparatus of generating a reduced air screen immediately in front of the vehicle to thereby reduce the opposition to the vehicle movement by minimizing the compression characteristic normally introduced by the moving vehicle. Generally, in accordance with the present invention, a jet air stream means preferably including a plurality of distributed jets is generated immediately preceding the vehicle. The air stream means is in a plane or planes normal to the direction of movement and functions to evacuate the air from immediately in front of the vehicle and thereby reduce the opposing pressure as well as the mass of air with the resulting greater ease in movement of the vehicle. Generally, a suitable air pumping means is located adjacent to the forward portion of the vehicle and supplies pressurized air to an air jet deflector which is adapted to establish the special fluid jets. The air from in front of the vehicle is removed by fluid entrainment. The air pressure immediately in the area into which the vehicle moves is therefore reduced. This will also minimize the turbulent air stream that moves over the vehicle thereby minimizing the opposing draft forces on the moving vehicle.

More particularly as applied to an automobile, an air pump is located adjacent to the radiator and may advantageously be placed immediately behind the radiator as not to unduly interfere with the air flow through the conventional radiator. A small air jet forming unit is mounted in front of the vehicle having an inlet connected to the air pump. In operation, the air pump is driven from the vehicle internal combustion engine or may be provided with a completely separate source depending upon the construction of the vehicle. The forming unit will have outlets directed at right angles to the line of motion and the air pump is constructed to establish individual or substantial number of circumferentially distributed high speed or high flow high velocity air jets. The jets forming unit may be preferably formed in a generally semi-circular pattern with the lower portion free of jets. This will permit the removal of the air from immediately preceding the automobile while permitting sufficient air flow to the radiator.

The flowing jets will not only remove the air from the immediately adjacent area but through the concept of entrainment will provide an increased air flow from in front and back thereof to increase the area of the removed air and the low pressure area. The positioning of the air outlets may be controlled to provide a variable air projection in accordance with speed or the like. Further, the air jets may be controlled to permit adjustment in accordance with cross wind conditions. The valves may be manually controlled or automatically varied in accordance with the cross wind conditions.

Although significantly applied to land vehicle the concept of the present invention might also be applied to other forms of vehicles such as aircraft. Thus generally the aircraft relies on the differential path across the wing to generate a lift on the aircraft. The air resistance, however, exhibited by the wing or air foil section is desirably minimized. In accordance with this invention, an appropriate air screen apparatus is secured to the forward or leading edge of the wing to produce air jets moving normal to the direction of the movement of the air foil section. The relative oppositely directed air jets would minimize the wind resistance and further would effectively change the contour of the air foil section as such. This would provide a means to control the lift and the air foil section could be made thinner to further reduce the air resistance while maintaining the required lift.

The present invention could, of course, within the broadest aspects also be applied to other land vehicles, water vehicles and the like which have a significant forward wall surface.

BRIEF DESCRIPTION OF THE DRAWING

The drawing furnished herewith illustrates a preferred construction of the present invention in which the above advantages and features are clearly disclosed as well as others which will be readily understood from the description of the illustrated embodiments.

In the drawing:

FIG. 1 is a front elevational view of an automobile incorporating the present invention;

FIG. 2 is a top, fragmentary view of the forward components of the automobile and the components of this invention to illustrate the present invention;

FIG. 3 is a vertical section taken generally on line 3—3 of FIG. 2;

FIG. 4 is a sectional view taken generally on line 4—4 of FIG. 3;

FIG. 5 is a sectional view taken generally on line 5—5 of FIG. 2;

FIG. 5a is a diagrammatic view of a cross-wind valve control means;

FIG. 6 is a top view with parts broken away and sectioned showing an alternate construction of a powered air screen device control constructed in accordance with the present invention;

FIG. 7 is a diagrammatic end illustration of a wing for an aircraft incorporating the present invention;

FIG. 8 is a fragmentary top view of the wing section shown in FIG. 5;

FIG. 9 is an enlarged fragmentational view taken generally on line 9—9 of FIG. 8;

DESCRIPTION OF THE ILLUSTRATED EMBODIMENTS

Figure 10:
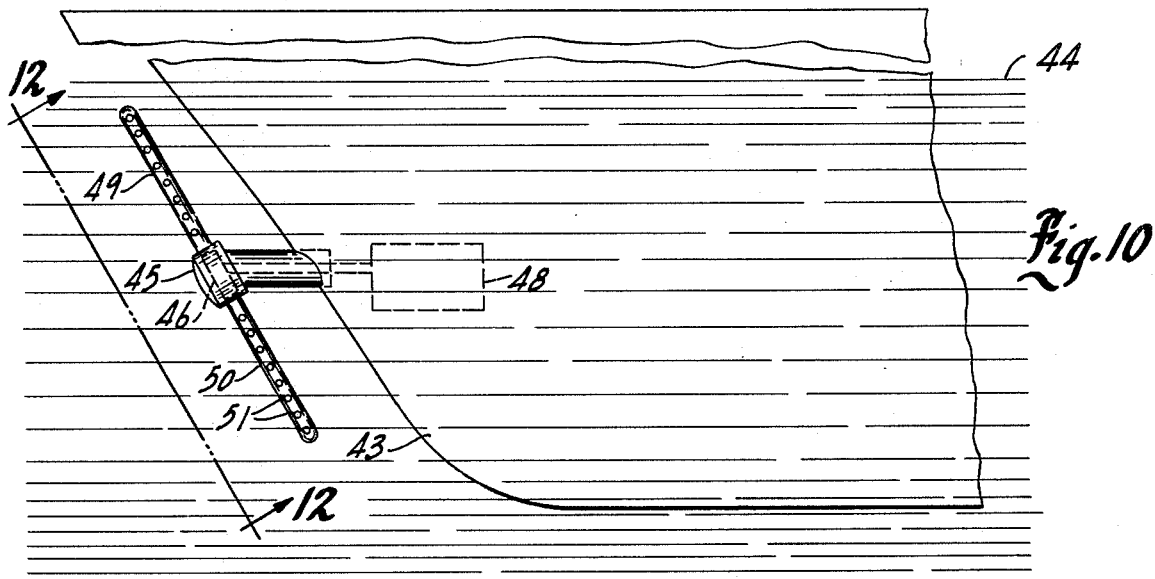
FIG. 10 is a side elevational view illustrating the invention applied to a watercraft.

Referring to the drawings and particularly to FIGS. 1 and 2, the present invention is illustrated applied to a conventional internal combustion automotive vehicle 1 which is adapted to be driven from a front mounted internal combustion engine 2. The vehicle in accordance with conventional construction is totally enclosed with a rear passenger portion 4 projecting upwardly of the engine compartment 5. The vehicle thus presents a significant front area which must pass through a body of air as the vehicle moves forwardly. In accordance with the present invention, an air jet unit 6 is mounted forwardly of the vehicle's front radiator section and is adapted to establish a plurality of high velocity air jets 7–11, shown as circumferentially distributed in a generally semi-circular fashion. The air jets 7–11 move outwardly in front of the vehicle compartments 4 and 5, with jets 7 and 8 extending generally laterally to the left side of the vehicle, jet 9 moving directly upwardly and jets 10 and 11 moving laterally to the right side of the vehicle, as viewed in FIG. 1. The high velocity air jets 7–11 will entrain air adjacent thereto and in essence withdraw air from in front of the vehicle. The entrainment and rapid outward movement of the air will be maintained in continuous, slightly spaced forward relation to the vehicle 1 and thereby provide a relatively low pressure area into which the vehicle moves. Thus, the air jets function to, in essence, constantly part the air from in front of the vehicle to reduce opposition to the forward movement of the vehicle. In particular, the vehicle will not compress the same significant air masses as the conventional automobile in moving the air laterally and the train of turbulent air which generally moves over the outer surface of the vehicle should also be minimized. The frictional drag on the vehicle should therefore also be minimized.

More particularly, in the illustrated embodiment of the invention, the air jet unit 6 is shown coupled to an air pump 12 located immediately behind the radiator 13 of the vehicle and coupled to be driven directly from the engine 2. The air pump 12 includes an outlet connected to the air source by a suitable connecting conduit 14 which extends beneath the radiator 13. The illustrated air pump 12 is diagrammatically shown as a simple centrifugal fan unit having an outer cylindrical housing 15. A plurality of equicircumferentially-spaced air blades 16 are mounted within the housing and secured to a drive shaft 17 by a suitable spider support 18. The air blades 16 pass through the air chamber drawing air inwardly from a front wall opening 19, accelerating the air within the housing 15 and discharging the high pressure air through a discharge conduit 20 to the connecting conduit or line 14. This provides a source of high pressure air which is transmitted to the air jet unit 6.

As more clearly shown in FIG. 5, the illustrated air jet unit 6 includes a suitable housing 21 with a plurality of air jet channels 22 spaced within the housing in accordance with the desired location of the jets 7 through 11, inclusive.

The illustrated air jet source or unit 6 is generally a semicircular member with a flat bottom portion 23. The air jet channels 22 are located to the opposite sides and top only leaving the bottom portion of the vehicle moving through the generally normal air flow path.

Thus the lowermost side streams 7 and 11 may entrain a slight amount of the air from immediately beneath the air source, but it will be significantly less than in the other areas. This is desirable to allow sufficient air to move beneath the air source and through the radiator 13 to provide cooling function as well as to provide some air into the air pump 6 for establishing of the high velocity air jets 7–11.

The channels terminate in a common central inlet chamber 24 coupled to the connecting line 14. Thus as the high pressure air is removed from the pump 12 and through the conduit 14, it is directed and discharged in generally similar relationship through the several channels 22 to develop the jets 7 through 11 as high velocity jets. The jets 7–11 will tend to spread as they move from the air unit 6. The effectiveness and length of the jet may be controlled by controlling the length of the air jet channels 22. For example, in the illustrated embodiment of the invention, small telescopic jet extenders 25 are shown within the main housing 21 to permit extension and contraction of the jet channels for controlling the jet with respect to the vehicle.

Further in accordance with the illustrated embodiment of the invention, a deflecting valve control unit 26 is provided in the line 14 immediately adjacent the inlet chamber, as most clearly shown in FIGS. 5 and 5a. The valve unit 26 is adjusted to control the side jets 7–8 and 10–11 to compensate for the side-wind characteristics encountered under normal vehicle operating conditions. The rotation of the valve 26 diverts or divides and varies the relative air directed to the right and left sides of the inlet chamber 24 to correspondingly vary the relative size of the jets 7–8 and 10–11 to the right and left side of the vehicle. The valve unit 26 is shown with a simple input lever 27 which is coupled through a conventional push-pull type control 28 for manual positioning. In actual practice, the valve unit 26 may be provided with an automatic cross-winds sensing device which will sense both direction and magnitude and provide corresponding related stepped positioning of the air flow valve.

Thus, in operation, the air pump 12 is operated simultaneously with the forward movement of the vehicle. During the operation, it develops an air screen or low pressure air screen in front of the vehicle thereby eliminating the continuous compression of the air mass in front of the vehicle and also significantly reducing the air stream passing over the vehicle surface. The individual jets 7–11 will entrain the adjacent air from in front of the vehicle and thus provide an essentially continuous air screen or pressure air chamber over the principal portions of the forward wall of the vehicle body.

The particular configuration and arrangement of the air jets may, of course, be widely varied and the particular air pump construction may similarly be widely varied. Further, the air pump can be driven from the engine 2 as illustrated or could be provided with a completely separate, alternate source of power, for example, an electric motor, a separate internal combustion engine motor or the like.

An alternative pump construction is diagrammatically illustrated in FIG. 6, for example. Generally, the air pump unit of FIG. 6 is provided with an outer housing 28 having an apertured front wall 29 providing an air intake for a stream 30 to a pumping chamber 31. A centrally located conical member 32 is provided within the chamber 31 to form an annular chamber with a fan blade unit 33 located within the base portion. The fan blade unit 33 draws air inwardly through the opening and through the air chamber and discharges it into an annular discharge plenum chamber 34. In the illustrated embodiment of the invention of FIG. 6, a single continuous plenum chamber provides a continuous reverse path extending backwardly and then forwardly to a plurality of jet nozzles 35 adjacent the side of the air chamber 31. Thus by high speed rotation the fan blade assembly 33, a continuous air jet stream is generated across the front of a vehicle resulting in removal of the air from the immediately adjacent to the front wall of the vehicle. Any other suitable air jet source can, of course, be employed.

Further as previously noted the present invention can, of course, be applied to any other land, water or air vehicle having a significant surface and flow resistance characteristic. For example, the air jet control concept of this invention can be applied to aircraft for example, as shown in FIGS. 7–9 in which a wing section 36 of an aircraft 37 is diagrammatically illustrated.

Thus as shown in FIG. 7, the wing 36 is formed as an air foil section with the leading edge specially formed with an air screen generator 38. In the illustrated embodiment of the invention, the air screen generator 38 is a simple projection with top and bottom wall openings 39 and 40 through which air jets 41 and 42 are generated at essentially right angles to the wing movement. Air under pressure is directed through the apertures 39 and 40 along the leading edge with the ratio of the flow controlled. The resulting air jets 41 and 42 will effectively vary or change the effective contour of the air foil section and, consequently control the lift characteristic. The air jets 41 and 42 may further function to vary the air movement over the wing 36, and thereby minimize the air drag or friction. Generally, the air foil section would appear to function with a thinner cross sectional configuration to further minimize the wind resistance. By minimizing frictional characteristics, the invention should also contribute to a reduction in the noise characteristics of aircraft.

As applied to aircraft, an air jet unit similar to that illustrated for a vehicle may also be applied to or preceeding the nose portion of an aircraft. For example, the unit of FIG. 6 might be incorporated into the nose portion of the aircraft with the discharge ends of the jet passageways 35 located as the forward portion.

Although shown with a single jet plane, a plurality of such planes may be employed. For example, a second jet plane may be located in the hood portion 5 of a vehicle to provide approximate air removal adjacent the automobile windshield to more effectively minimize the wind's resistance adjacent to the windshield. Thus the particular location of the air jet stream can be controlled or positioned to provide optimum results.

The particular method of generating air jets and the number and arrangement thereof can of course be widely varied depending upon the construction of the particular vehicle and the like.

The present invention thus provides a relatively simple system for reducing the atmosphere opposition to movement.

The invention as applied to watercraft may provide a parting of the air above the water line. Further, within the broadest concept of the invention, the invention may also be applied to part the water below the water line and develop a relatively low pressure area in front of the watercraft. FIGS. 10–13 illustrate this aspect of the invention.

Figure 11:
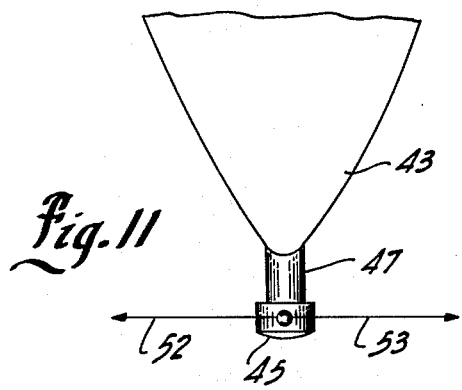
FIGS. 11 and 12 are top and front views of FIG. 10.
Figure 12:
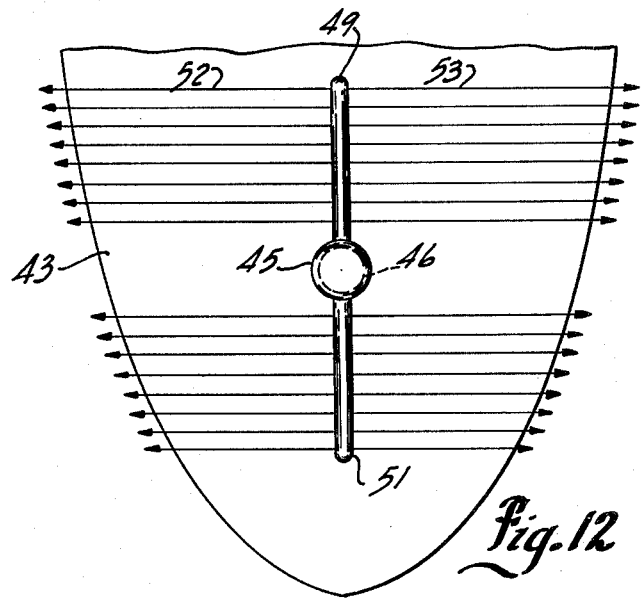

Referring particularly to FIGS. 10–12, the front portion of a watercraft 43 is shown within a water body 44. Watercraft 43 may be a large ship or even a small pleasure boat. A screen forming apparatus 45 is secured to the bow of the watercraft 43 and includes a central water pump 46 secured to the bow by a suitable mount 47. The pump 46 is driven from a suitable prime mover 48 and establishes a high pressure water flow into a pair of oppositely directed jet nozzle conduits 49 and 50. Each of the conduits 49 and 50 are similarly constructed with water jet nozzles or orifices 51 on diametrical opposite sides thereof to form a pair of oppositely directed jets 52 and 53 in a plane perpendicular to the watercraft forward movement. The high pressure water jets 52 and 53 will tend to part the water from in front of the craft to permit the craft to move forwardly more readily under the normal driving forces. The conduits 49 and 50 would appear to produce an optimum effect when generally inclined in accordance with the configuration of the bow as shown in FIG. 10 and with the perpendicular jets as shown in FIG. 11.

Figure 13:
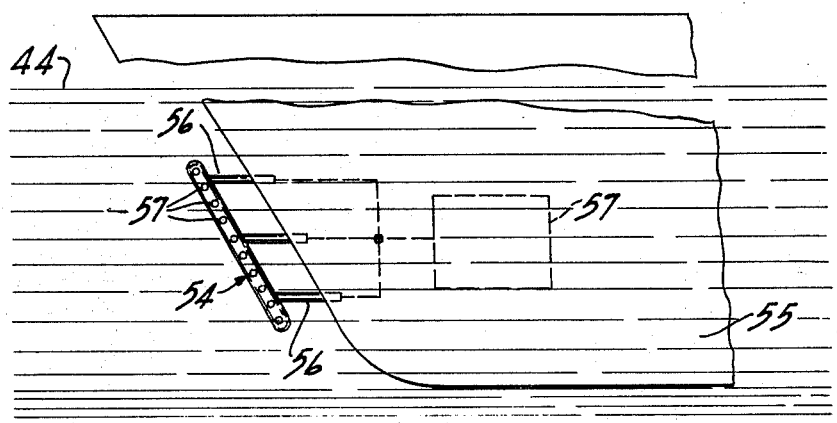
FIG. 13 is a fragmentary view similar to FIG. 10 of a further embodiment applied to a watercraft.

The water parting may also employ air jets for example as shown in FIG. 13 wherein an air jet conduit 54 is secured to the bow of a boat 55 by suitable struts or supports 56. The conduit 54 extends parallel to the bow and is coupled to a high pressure air source 57 of any suitable construction, as by passageways through one or more of the supports 56. The conduit 56 is provided with a plurality of longitudinal spaced side nozzles or orifices 57 to establish oppositely directed lateral air jets moving in a plane perpendicular to the craft in the same general manner as shown in FIG. 11 for the water jets. The air jets will tend to remove part of the water with formation of a low pressure screen in front of the craft. With the air jets, air bubbles may form within the low pressure area and move rearwardly beneath and over the submerged surface of the watercraft. Such air bubbles would tend to further reduce the frictional drag on the boat as well as increase the buoyancy of the craft to further increase the ease of movement through the water.

Various modes of carrying out the invention, are contemplated as being within the scope of the following claims, particularly pointing out and distinctly claiming the subject matter which is regarded as the invention.

I claim:

1. In a land vehicle having ground support means for movement over land and adapted to be moved through the atmosphere, said vehicle having a forward wall means moving through and parting the air as the vehicle moves through the atmosphere, an air jet forming means mounted forwardly of such wall means and being substantially smaller than the forward wall means and having orifice means essentially parallel to such wall means and forwardly of the wall means connected to said jet forming means and establishing at least one high velocity air jet screen from said orifice means projected essentially normal to the direction of movement of said wall means and operable substantially over substantially the entire wall area for removing of the air from in front of said wall means by entrainment of air within such jet and thereby minimize the compression of the air wall forwardly of said wall means and thereby minimize the opposition to vehicle movement, said air jet forming means is mounted centrally of such wall means of the vehicle and establishing a plurality of jets projected essentially normal to the direction of movement, said plurality of jets including individual side jets moving in opposite directions and upwardly directed jets.

2. The apparatus of claim 1 wherein said air jet forming means includes an air pump means coupled to the vehicle and having an output coupled to a plurality of jet forming channels, and means to control the relative strength of the air jets to the opposite side of said vehicle to thereby compensate for cross wind characteristics.

3. In a vehicle adapted to be moved through the atmosphere, said vehicle having a forward wall means moving through and parting the air as the vehicle moves through the atmosphere, an air jet forming means mounted forwardly of such wall means and having orifice means essentially parallel to such wall means and forwardly of the wall means connected to said jet forming means and establishing at least one high velocity air jet from said orifice means projected essentially normal to the direction of movement of said wall means and operable substantially over the wall area for removing of the air from in front of said wall means and thereby eliminating the compression of the air wall forwardly of said wall means and thereby minimize the opposition to vehicle movement, said vehicle is an aircraft having a forwardly projecting nose portion, said jet forming means secured to the nose portion and establish the air jets forwardly of the aircraft.

* * * * *